(12) United States Patent
Levine

(10) Patent No.: US 11,344,396 B2
(45) Date of Patent: May 31, 2022

(54) STRESS-RELIEVING ANIMAL TREATMENT AND HANDLING DEVICE

(71) Applicant: Surell G. Levine, Hopkinton, MA (US)

(72) Inventor: Surell G. Levine, Hopkinton, MA (US)

(73) Assignee: Surell G. Levine, Hopkinton, MA (US)

( * ) Notice: Subject to any disclaimer, the term of this patent is extended or adjusted under 35 U.S.C. 154(b) by 335 days.

(21) Appl. No.: 16/557,037

(22) Filed: Aug. 30, 2019

(65) Prior Publication Data
US 2021/0059215 A1  Mar. 4, 2021

(51) Int. Cl.
*A61D 3/00* (2006.01)
*A01K 15/04* (2006.01)

(52) U.S. Cl.
CPC ............... *A61D 3/00* (2013.01); *A01K 15/04* (2013.01); *A61D 2003/003* (2013.01); *A61D 2003/006* (2013.01)

(58) Field of Classification Search
CPC .................................. A01K 15/04; A61D 3/00
See application file for complete search history.

(56) References Cited

U.S. PATENT DOCUMENTS

| | | | |
|---|---|---|---|
| 3,150,640 A | 9/1964 | Nevitt | |
| 3,547,079 A | 12/1970 | Bassett | |
| 3,749,064 A * | 7/1973 | Weinstein | ............ A01K 13/002 |
| | | | 119/664 |
| 4,137,870 A | 2/1979 | Cano | |
| D289,806 S | 5/1987 | Hadaway | |
| D291,014 S | 7/1987 | Grum | |
| 5,109,801 A | 5/1992 | Gahagan | |
| 5,309,866 A | 5/1994 | Santoro | |
| 5,839,393 A | 11/1998 | Rupp et al. | |
| 5,975,028 A | 11/1999 | Wetmore | |
| 6,170,438 B1 * | 1/2001 | Marwah | ............... A01K 13/006 |
| | | | 119/600 |
| 6,394,039 B1 * | 5/2002 | Grauer | ................. A01K 1/0613 |
| | | | 119/497 |
| 6,868,566 B2 * | 3/2005 | Gatten | ................... A41B 13/06 |
| | | | 5/413 R |
| D513,357 S * | 1/2006 | Allard | .................... A47G 9/083 |
| | | | D2/718 |
| 7,131,399 B2 | 11/2006 | Blommel | |

(Continued)

OTHER PUBLICATIONS

Young, Lee (ISA Authorized Officer); International Search Report & Written Opinion, dated Oct. 21, 2020; 8 pages ISA/US; Alexandria, VA; all references cited herein.

*Primary Examiner* — Michael H Wang
(74) *Attorney, Agent, or Firm* — Davis, Malm & D'Agostine, P.C.; Richard L. Sampson

(57) ABSTRACT

An animal treatment and handling device and method includes a fabric bag sized and shaped to receive the animal's torso and legs therein, with dorsal and ventral surfaces extending longitudinally from an anterior to a posterior end. The bag includes an adjustable collar at the anterior end, and a first zipper extending along the dorsal surface from an anterior end portion to a posterior end portion. An integral, elongated outer wrap extends transversely with a length sufficient to be wrapped around the bag and the animal therein to impart a uniform, calming pressure to the animal's thorax. A plurality of alternately openable and closable doors provide physician access to the animal through the bag and through the outer wrap.

7 Claims, 10 Drawing Sheets

(56) References Cited

U.S. PATENT DOCUMENTS

| | | | |
|---|---|---|---|
| 7,774,875 B1 * | 8/2010 | Zeidman | A47G 9/083 5/413 R |
| D644,413 S * | 9/2011 | Keall | A41B 13/06 D2/718 |
| 8,307,462 B1 * | 11/2012 | Kenney Purcaro | A41D 13/04 2/48 |
| 8,539,620 B1 | 9/2013 | Wynh | |
| 8,733,296 B1 | 5/2014 | Douglas et al. | |
| 9,131,734 B2 * | 9/2015 | Daugherty | A41B 13/06 |
| D756,043 S * | 5/2016 | Woehler | D30/151 |
| 10,188,150 B2 * | 1/2019 | Zeidman | A47G 9/083 |
| 2006/0060155 A1 | 3/2006 | Ip | |
| 2015/0083054 A1 | 3/2015 | Blizzard | |
| 2015/0305302 A1 | 10/2015 | Raftopoulos | |
| 2016/0113331 A1 | 4/2016 | Blackar | |
| 2018/0055009 A1 | 3/2018 | Wyatt et al. | |
| 2018/0139921 A1 | 5/2018 | Kath | |
| 2018/0332821 A1 | 11/2018 | Bedenbaugh et al. | |

\* cited by examiner

STRESS-RELIEVING ANIMAL TREATMENT AND HANDLING DEVICE

BACKGROUND

Technical Field

This invention relates to animal restraint devices and specifically to animal restraint devices adapted for animals such as cats and dogs for veterinary examinations.

Background Information

Restraining animals, such as cats, is a necessary part of administering normal veterinarian care. Often, certain procedures such as administering intravenous or subcutaneous injections, trimming claws, observing and treating wounds, or other procedures requires that the animal be restrained so that the animal or the person performing the procedure is not injured.

It is sometimes standard practice in veterinary offices for an assistant to hold an animal while a procedure is performed. Often, a towel is used to encircle the animal while the assistant holds the animal for the procedure. In some cases, a scared and partially restrained animal may become highly agitated and injure itself or those humans attempting to care for the animal. In such cases, it may become necessary to partially or completely sedate the animal for the procedure. Anesthetics may have undesirable side effects or may add additional cost to the treatment of the animal. When anesthetics are not used, it is desirable to have the animal restrained quickly so that the animal does not struggle and fight its way free.

Thus, a need exists for a system and method for restraining an animal quickly, safely and reliably, and in a manner that tends to relieve, rather than exacerbate, stress in the animal. There is also a need for providing access to various portions of the animal in the restraint so that different procedures may be performed while the animal is restrained.

SUMMARY

An embodiment of the present invention includes an animal treatment and handling device in the form of a fabric bag, sized and shaped to receive the animal's torso and legs therein, and having dorsal and ventral surfaces each extending longitudinally from an anterior to a posterior end. The bag includes an adjustable collar at the anterior end, and a zipper extending along the dorsal surface from an anterior end portion to a posterior end portion. An integral, elongated outer wrap extends transversely with a length sufficient to be wrapped around the bag and the animal therein to impart a uniform, calming pressure to the animal's thorax. A plurality of alternately openable and closable doors, and zippers, provide physician access to the animal through the bag and through the outer wrap.

Another embodiment includes a method of handling and treating an animal. The method includes providing the aforementioned treatment and handling device, unzipping the zipper, opening the collar, and placing the collar around the neck of the animal. The animal is then placed in the bag, and the first zipper is then zipped beginning at the collar to enclose the animal in the bag. The outer wrap is then wrapped around the bag and the animal therein to provide thoracic pressure to the animal. The plurality of doors are selectively opened and closed and/or the zipper is unzipped, to provide physician access to the animal through both the bag and/or the outer wrap.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
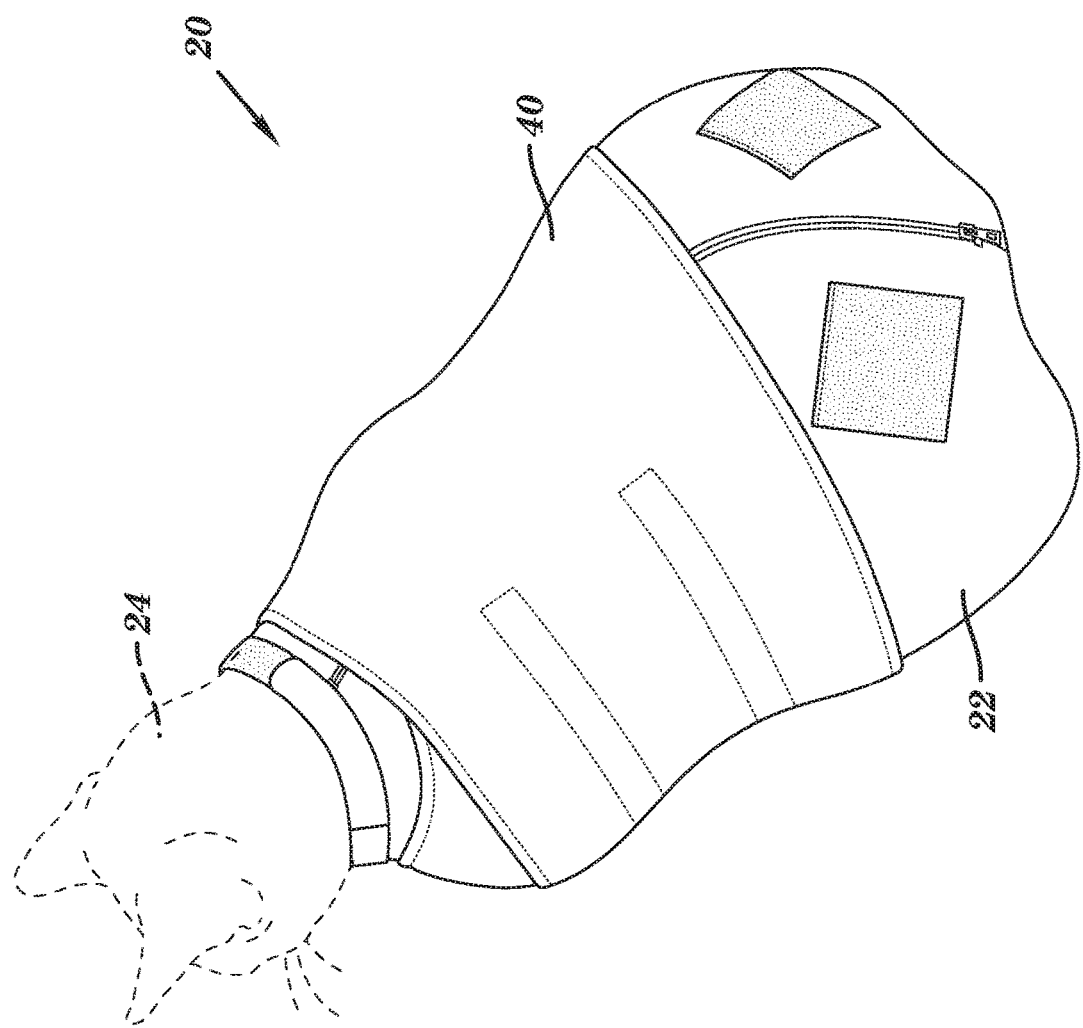
FIG. 1 is a perspective view of an embodiment of the subject invention in operative engagement with a cat as shown in phantom.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

As shown and described in greater detail hereinbelow, an embodiment of the present invention includes a stress-relieving animal treatment and handling device for animals such as dogs and cats, that zips up around the animal and has portions that wrap around the animal to provide uniform pressure about the animal's torso. It should be noted that for convenience of explication, the following discussion will refer to the animal as a cat, although the embodiments hereof may be similarly applied to any number of animals, including other small quadrupeds such as rabbits, and small dogs.

The device thus applies substantially constant/uniform pressure over the whole thorax and arms of the cat which serves to calm the cat, while also restraining the cat to facilitate examination and treatment by a veterinarian. As also shown, the device include various strategically placed openable access points ("doors") through which the veterinarian can access the cat to perform routine procedures such as drawing blood, nail trimming, giving vaccines, getting a urine sample, taking a temperature, doing a physical exam, giving fluids, taking a blood pressure, etc.

Figure 2:
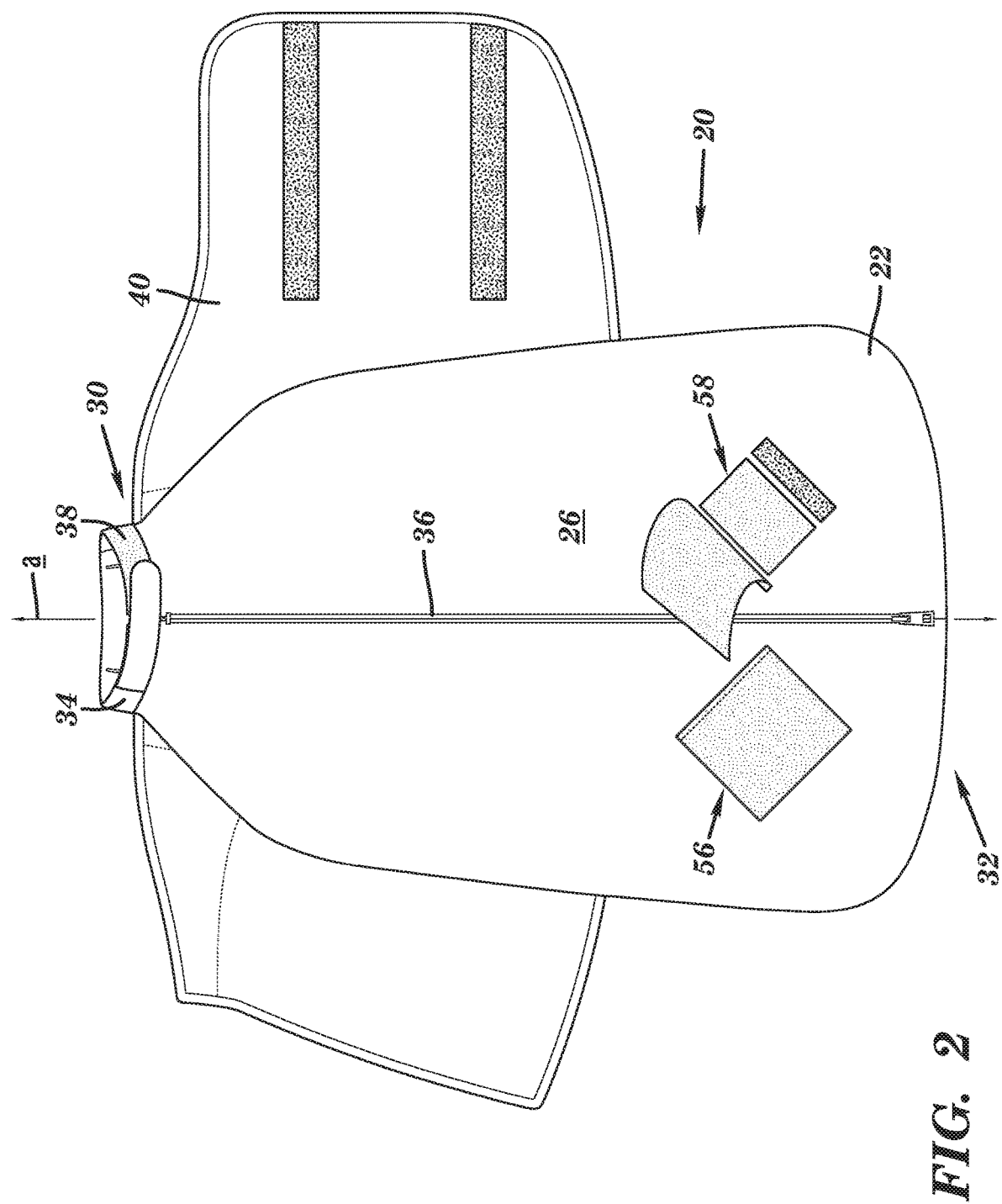
FIG. 2 is a top view of the embodiment of FIG. 1, without the cat, with the wrap portion in an unwrapped position, and with a door in its open position.
Figure 10:
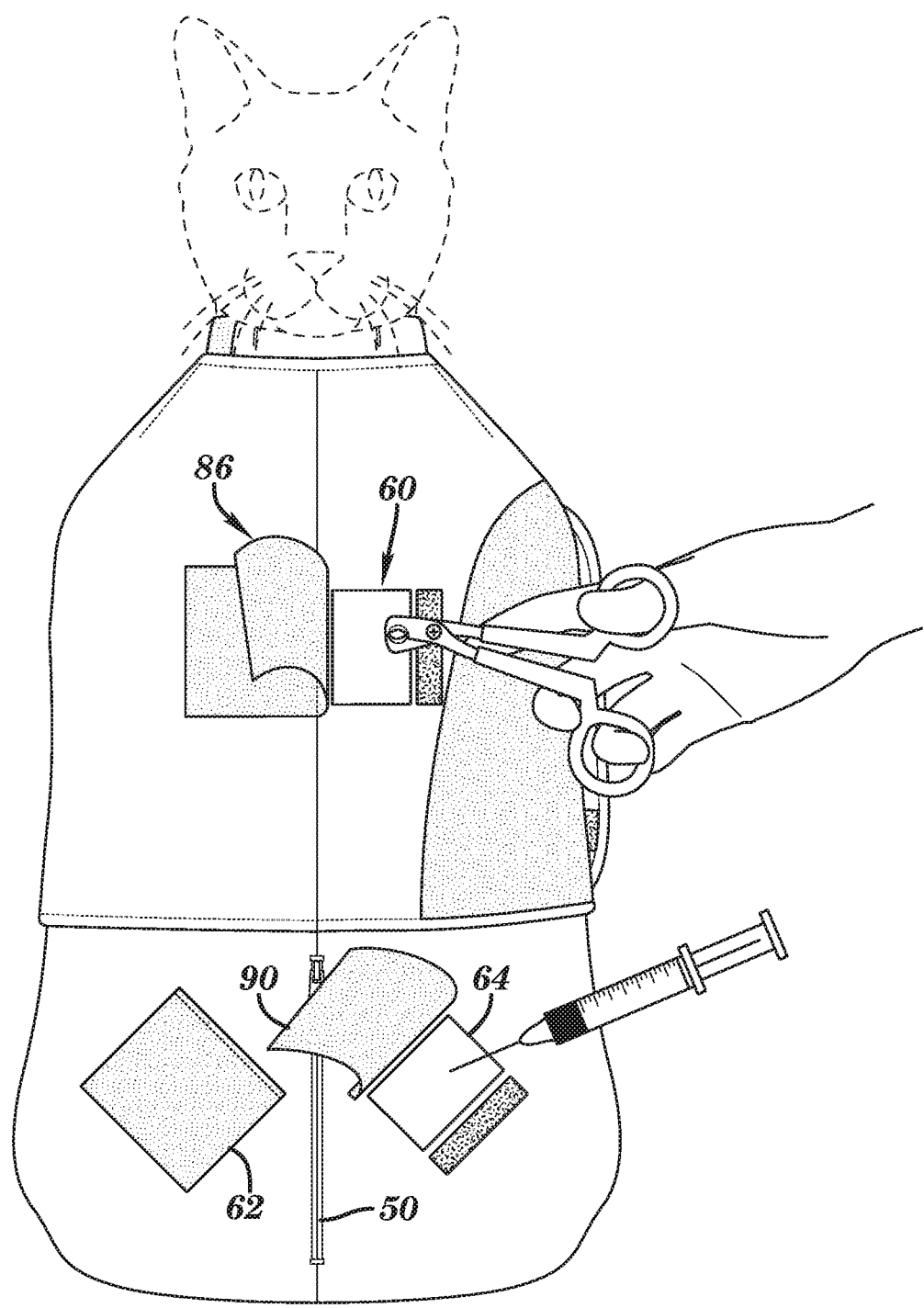
FIG. 10 is a bottom view of the embodiment of FIG. 1, with the cat shown in phantom, during additional optional steps in the method of use.

Terminology

Where used in this disclosure, the term "longitudinal" and/or "axial" when used in connection with an element described herein, shall refer to a direction relative to the element, which is substantially parallel to the spine of the cat when the cat is secured by the device as shown in FIG. 10, and shown by axis a in FIG. 2. Similarly, the term "transverse" refers to a direction other than substantially parallel to the longitudinal direction.

An aspect of the invention was the recognition by the inventor that cats are rarely cooperative for any procedure. Traveling to a veterinary clinic starts the stress cascade and then arriving at a clinic full of new smells and fear pheromones further escalate their stress. Conventional restraint systems for cats have solely focused on the restraint, not on the experience for the animal or the owner tasked with placing the animal within the restraint.

The instant inventor further recognized that application of deep, constant pressure tends to calm hypersensitivities and promote relaxation, as shown by decreased blood pressure, heart rate, metabolic rate, and/or muscle tone. Embodiments of the present invention have been configured to apply uniform constant deep pressure around the cat's body (thorax and lumbar area, depending on cat size) to provide a drug-free and lower stress cat restraint system for veterinary professionals and owners alike, to facilitate procedures such as nail trims, medication injections, topical medication, and oral medicating, etc.

It is noted that these embodiments operate in a manner that is contrary to the conventional wisdom that stress is necessarily heightened in animals when they are restrained and thus can't move freely. The present inventor has surprisingly found that these embodiments provide the restraint required to perform various veterinary procedures, not only without heightening the cat's stress, but to the contrary, actually lowering the cat's level of stress and anxiety. Because of this, owners and veterinary team members are able to help pets more easily and effectively than with conventional approaches, so that fewer team members are needed to succeed in treatment, while providing a better overall experience for cats and their owners.

Embodiments of the present invention are used by first placing the cat on top of an unzipped bag through easy entry large opening that extends more than the length of the typical cat body, and then attaching an adjustable collar around the cat's neck so that cat is somewhat restrained quickly. The user then zips the zipper starting at the neck and then zipping toward the cat's hind end. This approach of placing the cat in the bag, securing the collar, and then zipping away from the collar enables the cat to be easily secured even if it is anxious and fidgeting.

Once the cat is in the bag, an integral wrap is wrapped about the cat's torso to provide a snug fit. This approach enables the bag to be large enough to easily fit most cats, to make placement therein relatively easy, while the wrap effectively tightens the bag to the individual cat to apply the aforementioned calming pressure while securing the cat for treatment. The wrapping enables the device to tightly conform to cat's body providing deep touch and preventing struggling while the head is unhindered for free breathing and visibility. The device also holds animal in normal ventral recumbency/laying down position without placing limbs at awkward angles, therefore lessening alarm in the animal and reducing the likelihood of the cat injuring itself or trying to escape. It is important to note that the cat is not just free in the bag where it can roll around and get twisted and become more agitated and more difficult to examine. By keeping the cat firmly wrapped/swaddled, the device calms the cat and helps prevent the cat from gaining momentum in its mobility to allow the cat to be easily handled.

Once the cat is secured, various resealable access points in the device allow access to the cat for procedures such as blood draw, cystoscentesis, abdominal ultrasound imaging, vaccine and medication administration, grooming, nail trim, IV catheter placement, rectal temperature assessment, enema administration or anal gland assessment, as well as a thorough physical exam without need for assistance. Embodiments may also be used alone or in combination with a conventional soft collar to provide safe access to the cat's jugular vein for blood draws.

These embodiments may also be used in connection with fractious animals recovering from anesthesia that still need to be handled for medication delivery or to aid in a smoother recovery. Also, because the cat's body is held tightly, the cat's head movements are easily predictable to help reduce the chances of practitioners being bitten. Also, provision of zippers on both the front and back (dorsal and ventral) sides of the cat, which are able to be at least partially unzipped after application of the wrap, enables the practitioner to perform abdominal palpation to assess the cat's anatomy. The cat can be left still without roaming during examination of preparation of medication, allowing for efficiency which benefits everyone involved.

In particular embodiments, the device is fabricated from a fleece material (e.g., polar fleece), which is thick enough to substantially prevent the cat's claws from penetrating and injuring the user/care provider, and/or from getting caught. Moreover, in particular embodiments the hook and loop fasteners are configured with washable, soft 'non-loop' portions to avoid creating any areas of chafing and to decrease any likelihood of hair becoming caught in the fasteners as the collar or at the ends of the wrap portion. Such use of soft fabric and soft hook and loop fasteners with the wrap/swaddle aspect also tends to appeal to owners observing the procedures being performed on their pets. Since animals may often sense their owners' anxiety, appealing to the owners in this manner tends to reinforce the sense of calm. The device's use of quick release zippers and fasteners, without the use of any drawstrings that could tighten during a potential struggle, further support the overall sense of calm on behalf of animals and their owners.

Figure 3:
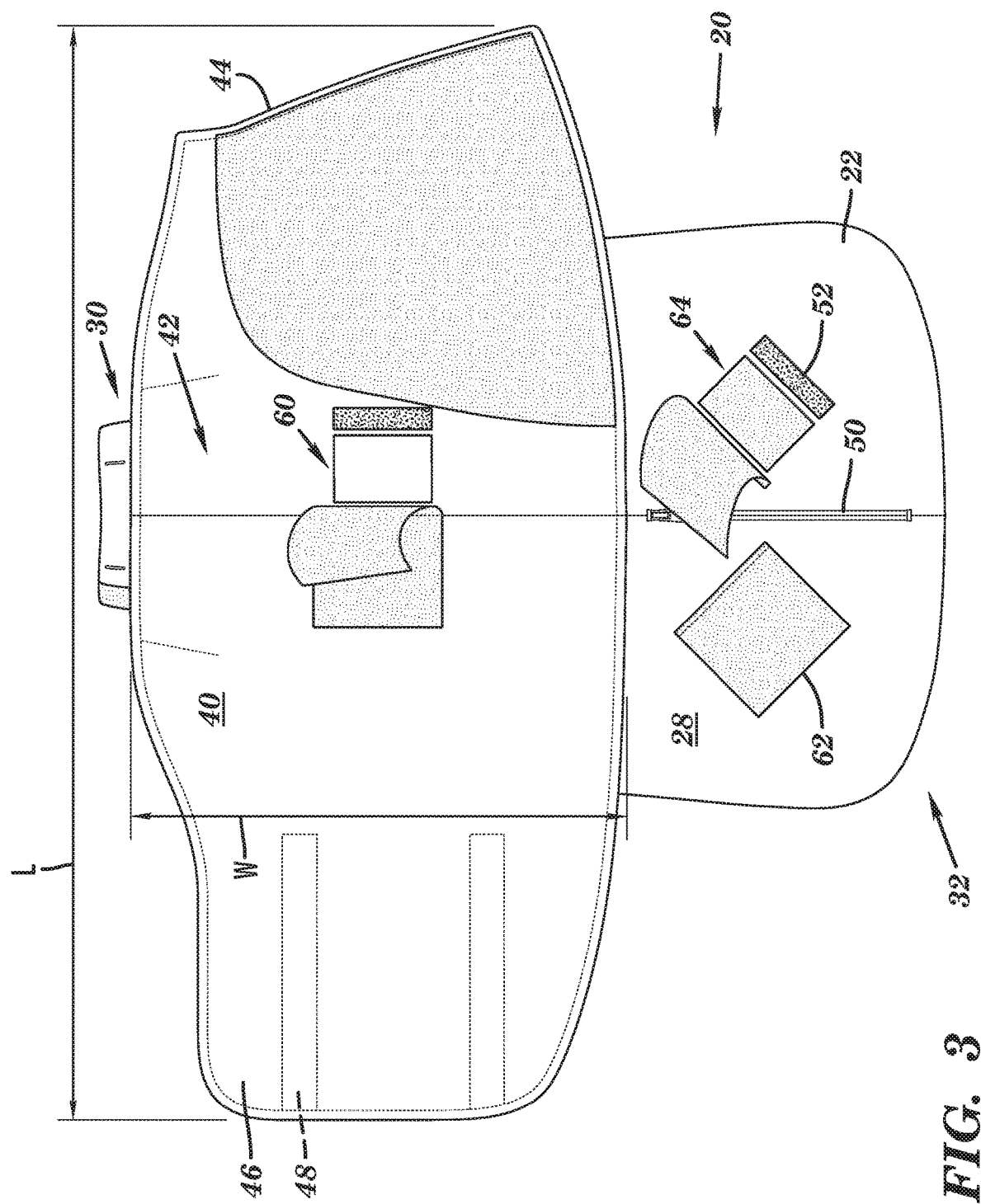
FIG. 3 is a bottom view of the embodiment of FIG. 2, with doors in their open positions.

Referring now to the accompanying figures, aspects of the present invention will be more thoroughly described. Turning to FIGS. 1-3, an embodiment of an animal treatment and handling device 20 in accordance with the present invention is shown. Device 20 includes a bag 22 fabricated from a fabric material, such as polar fleece, and is sized and shaped to receive the torso and legs of an animal (e.g., cat) 24 therein, as shown in FIG. 1. The bag 22 has a dorsal layer (surface) 26 and a ventral layer (surface) 28. Each surface 26 and 28 extends in a longitudinal direction a (FIG. 2) from an anterior end 30 to a posterior end 32. The bag 22 has an adjustable collar 34 disposed at the anterior end 30, and a first zipper 36 extending along the dorsal surface 26 from an anterior end portion to a posterior end portion.

In particular embodiments, the first zipper 36 extends from the collar 34 to the posterior end portion, and the collar 34 includes a first hook and loop fastener 38 configured to adjustably secure the collar about the animal's neck.

As also shown, device 20 includes an integral, elongated outer wrap 40 having a length L and a width W. Length L extends transversely to the longitudinal direction, between opposite end portions 44 and 46. The length L is long enough to enable wrap 40 to be wrapped around the bag with the animal therein, as shown in FIG. 1, with the opposite end portions 44 and 46 disposed in overlapping engagement with one another.

In various embodiments, the width W is sufficient to extend within a range of from about one-third to two-thirds of the distance from the anterior end 30 to the posterior end 32 of the bag. Moreover, in particular embodiments, a central portion 42 of the wrap 40 is secured to the ventral layer (surface) 28 of the bag, e.g., with stitching, at a location closer to the anterior end 30 than the posterior end 32, as shown in FIG. 3. The wrap 40 is thus wrappable around the bag and the animal therein with end portions 44, 46 being disposed in overlapping engagement with one another and secured to one another with second hook and loop fastener portions 48 to apply thoracic pressure to the animal.

As also shown in FIG. 3, embodiments of device 20 include a second zipper 50 extending in the longitudinal direction along a posterior end portion of the ventral layer 28. Zipper 50 provides a physician with access to the posterior of the animal, as will be discussed in greater detail hereinbelow. Moreover, although first and second zippers 36 and 50 are shown as extending in the longitudinal direction, they may extend obliquely to the longitudinal direction and/or in the transverse direction in some embodiments. In particular embodiments, physician access to the animal is also provided by a plurality of doors, fabricated from fabric flaps, that are alternately openable and closable, e.g., via third hook and loop fasteners 52, to provide access to the animal through both the bag 22 and wrap 40. It should be noted that first, second, and third hook and loop fasteners 38, 48, 52, may be substantially any conventional hook and loop fasteners, such as those sold under the VELCO® trademark (Velcro Velcro USA Inc., Manchester, N.H.). Moreover, the hook and loop fasteners 38, 48, 52 may optionally be loopless' hook and loop fasteners that use a soft fabric such as velvet as the 'loop' side of the fastener instead of conventional plastic loops. While perhaps providing less fastening force than conventional loops, these loopless fasteners have been found to provide sufficient grip for many applications of device 20, while being less likely to become fouled with cat hair and the like.

As best shown in FIG. 2, the plurality of doors in various embodiments include first and second doors 56 and 58 extending through a posterior end portion of the dorsal surface 26 on opposite sides of the first zipper 36. As shown in FIG. 3, these embodiments include a third door 60 extending through the central portion of the wrap 40 and through the ventral layer 28. Ventral layer 28 may also include fourth and fifth doors 62, 64, extending through a posterior end portion of the ventral surface on opposite sides of the second zipper 50. It should be noted that although the number and positions of doors as shown and described has been found to be desired for many applications, any number of doors/positions may be provided without departing from the scope of the present invention.

Figure 4:
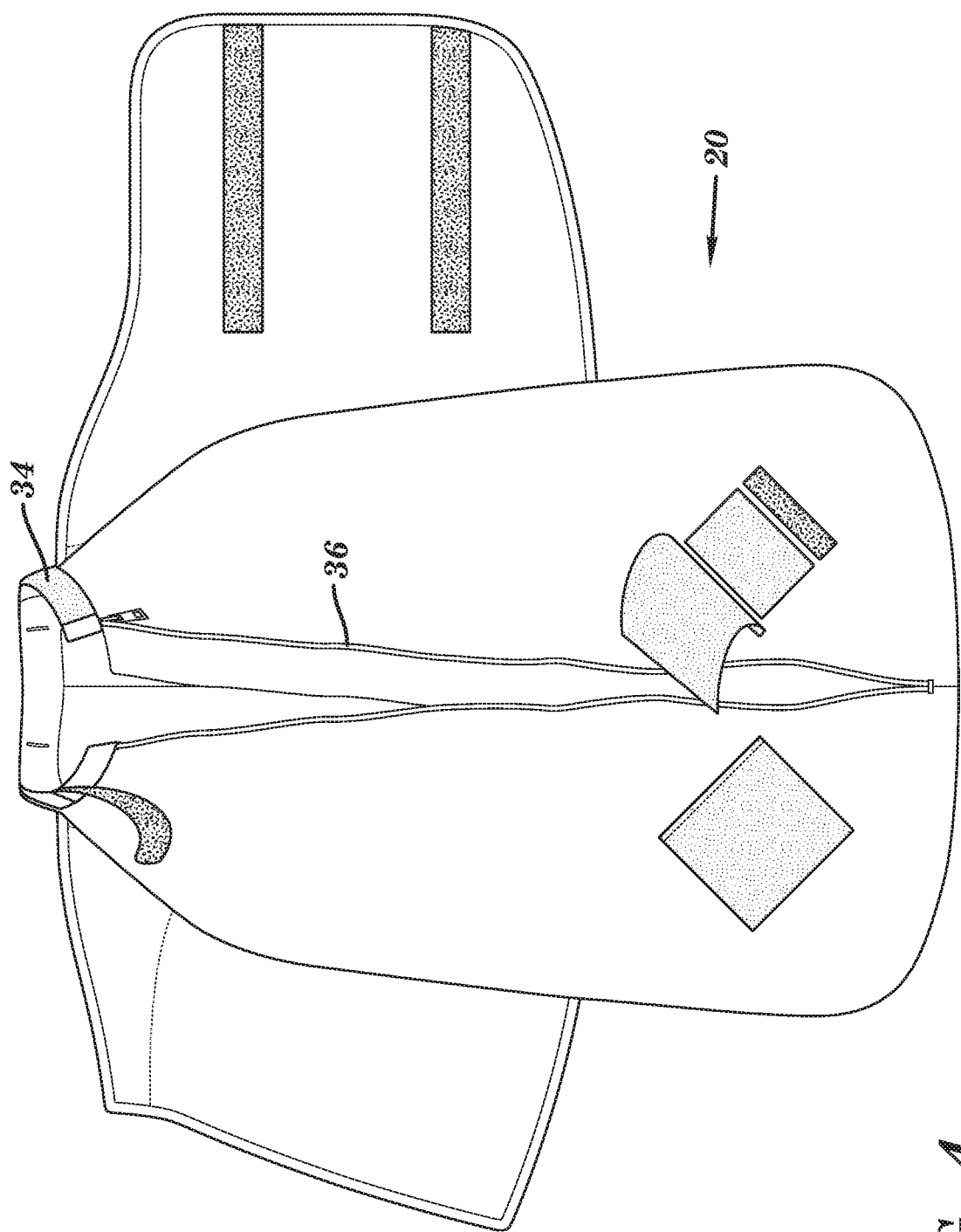
FIG. 4 is a view similar to FIG. 2, with a zipper in its unzipped position.
Figure 5:
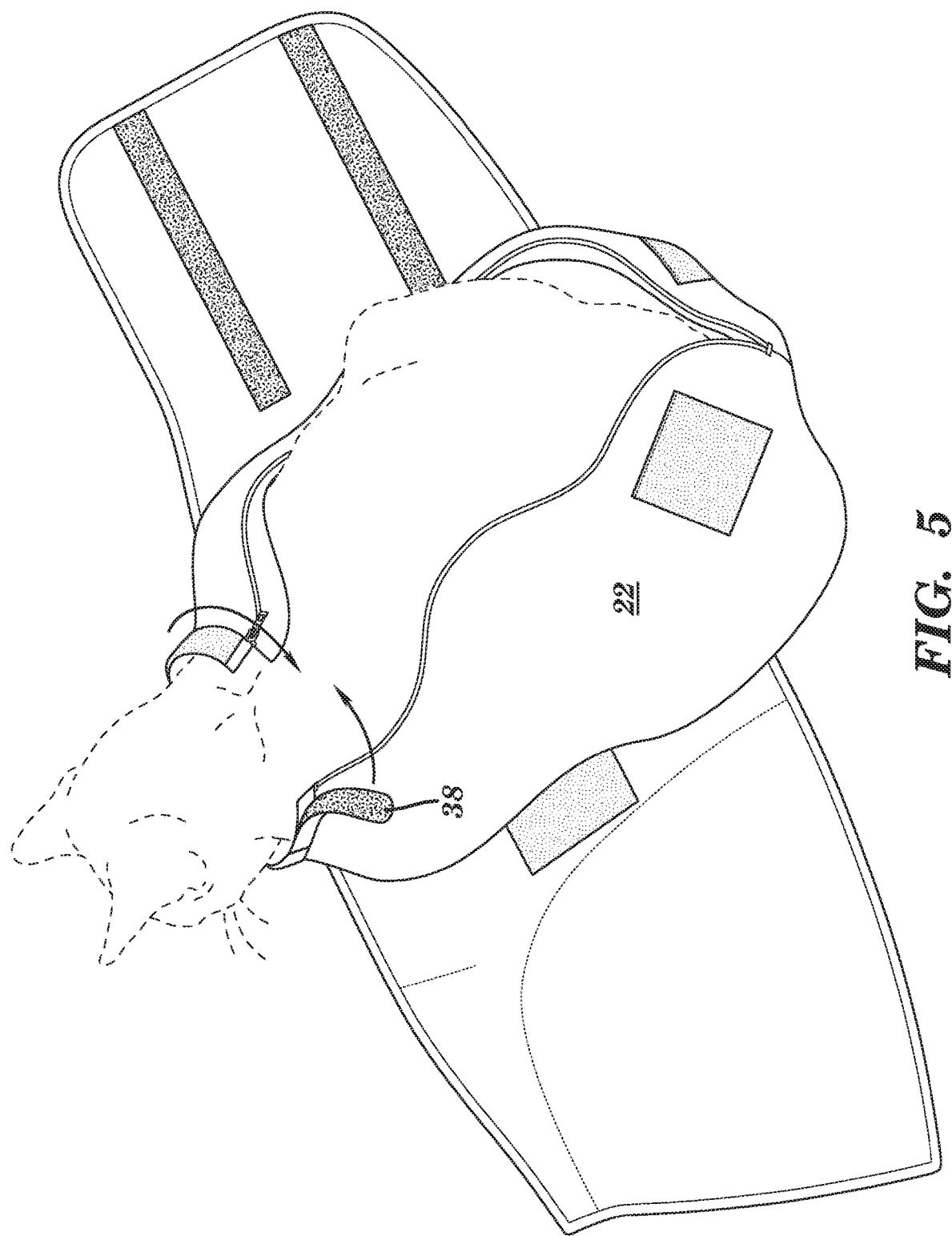
FIG. 5 is a view similar to FIG. 1, during a step in a method of use of the embodiment of FIGS. 1-4.
Figure 6:
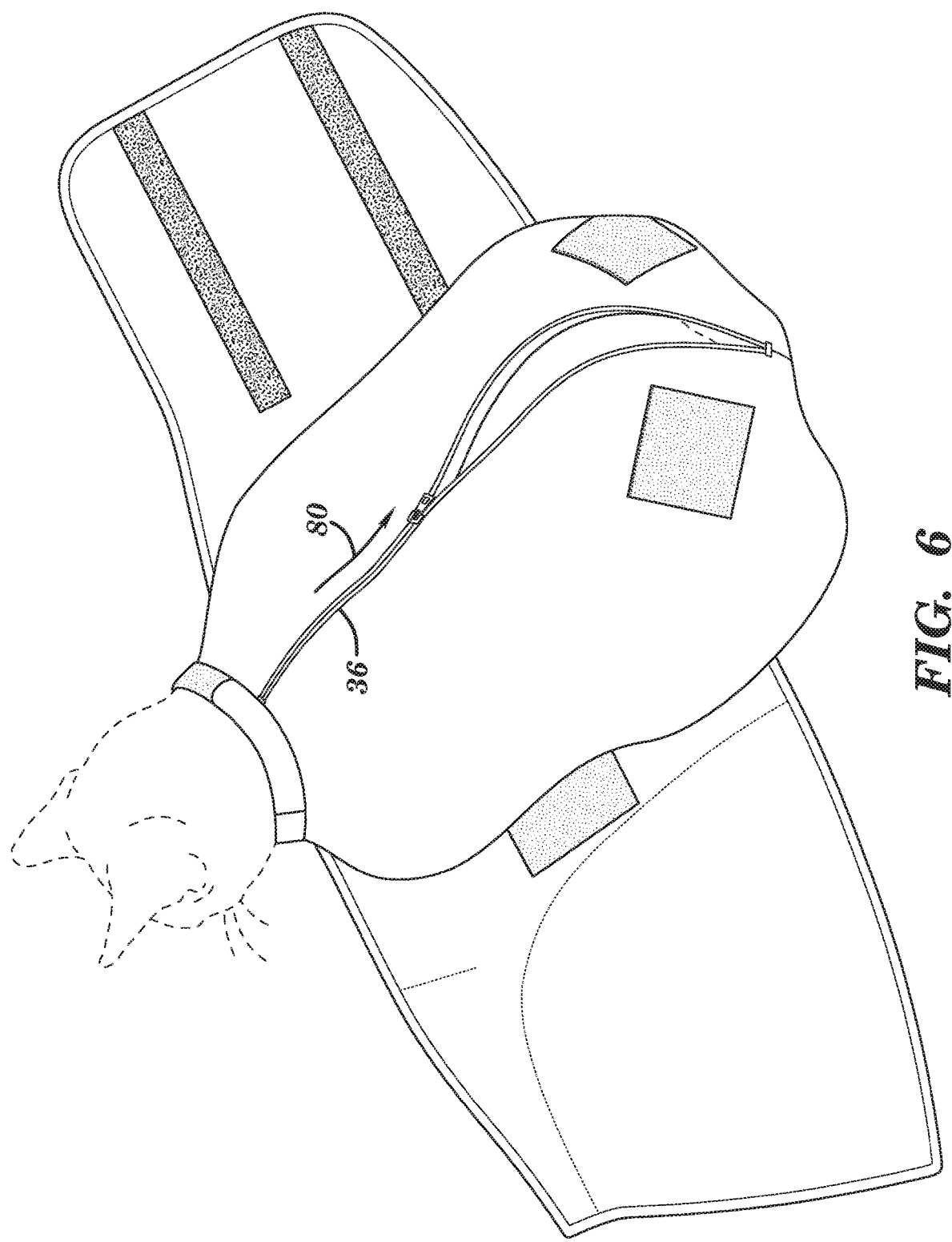
FIG. 6 is a view similar to FIG. 5, during a subsequent step in the method of use.
Figure 7:
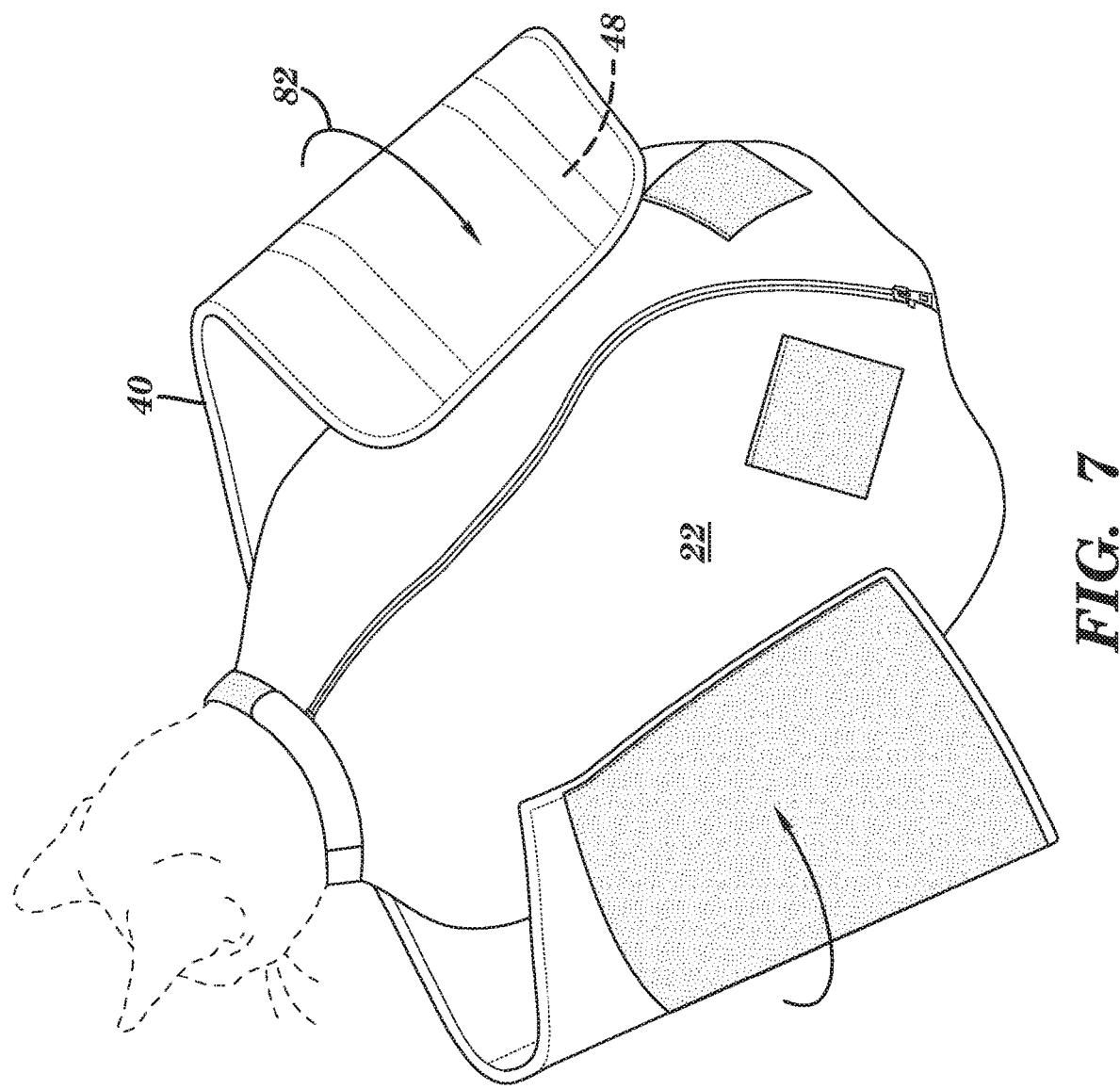
FIG. 7 is a view similar to those of FIGS. 5 and 6, during further step in the method of use.
Figure 8:
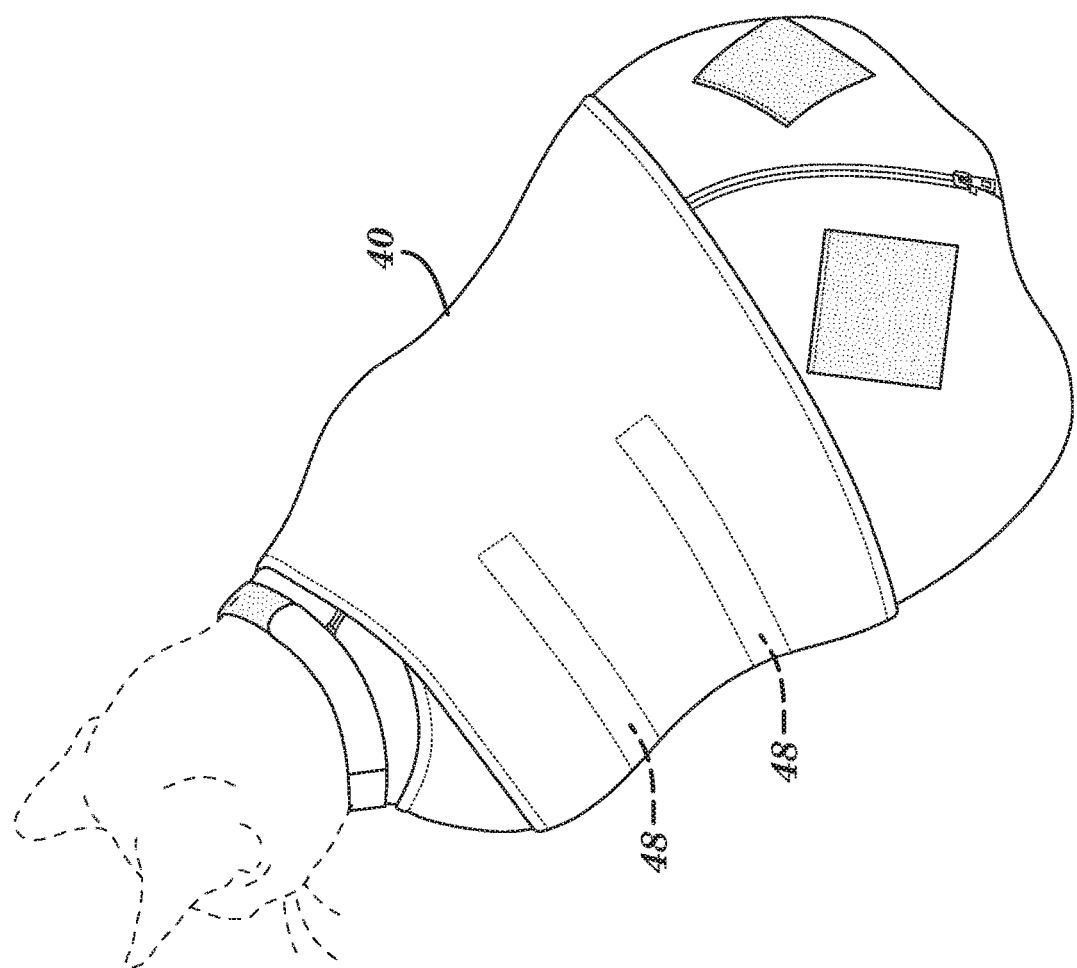
FIG. 8 is a view similar to those of FIGS. 5-7, during a still further step in the method of use.

An exemplary method of handling and treating an animal in accordance with embodiments of the invention will now be described with reference to FIGS. 4-10. Turning to FIG. 4, the method includes providing the treatment and handling device 20, opening the collar 34 and unzipping the first zipper 36. As shown in FIG. 5, the cat is then placed in the bag 22, and the collar fastened using the first hook and loop fasteners 38. It should be noted that the adjustable collar 34, by virtue of the adjustable fasteners 38, may accommodate different size necks of cats to keep them from getting their paws out the neck hole of the bag 22. These embodiments are thus configured to enable the collar 34 to be easily secured about the animal's neck (FIG. 5) while the animal is placed on top of, or within, the unzipped bag. The user may then zip the first zipper 36, beginning at the collar, as shown at 80 in FIG. 6, to enclose and retain the animal in the bag. The wrap 40 is then wrapped around the bag 22 as shown at 82 in FIG. 7, and secured using the second hook and loop fasteners 48, to provide uniform thoracic pressure to the cat as shown in FIG. 8.

Figure 9:
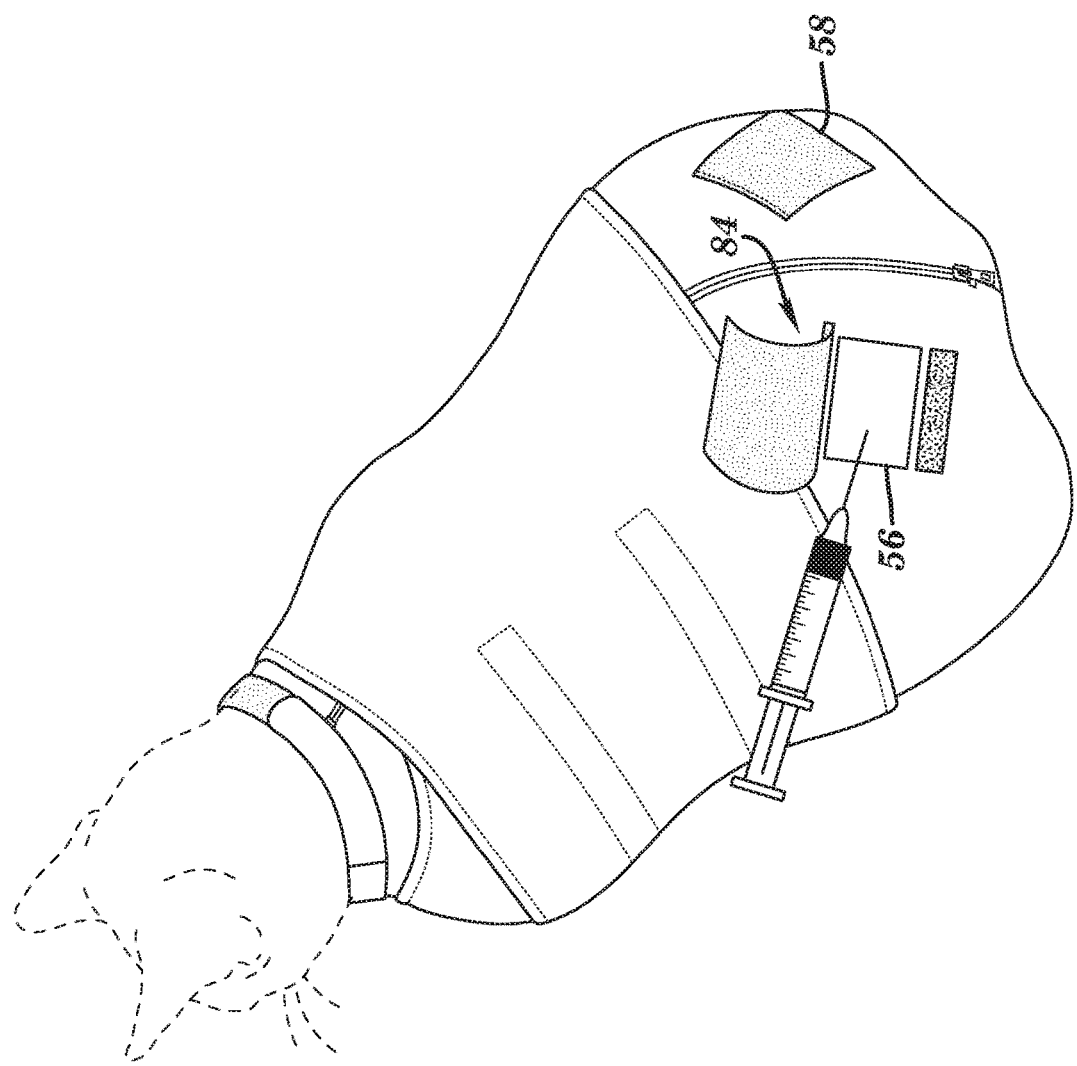
FIG. 9 is a view similar to those of FIGS. 5-8, during a yet further step in the method of use.

The plurality of doors 56-64 (FIGS. 9-10) and/or zippers 36, 50, are then selectively opened and closed to provide physician access to the animal through both the bag and the outer wrap, to enable the physician to perform various medical procedures. For example, as shown in FIG. 9, doors 56, 58 may be opened at 84 to allow access to hind thighs and/or legs for vaccination, medication injection, or viewing. First zipper 36 may also be partially unzipped to provide enhanced access to the posterior portion of the cat for various procedures such as palpating the abdomen and bladder, obtaining sterile urine samples with a needle, for ultrasound viewing, for cleaning wounds, and/or to access the back legs for blood draws at the medial saphenous vein and to get blood pressure. As shown in FIG. 10, door 60 may be opened at 86 to retrieve front paws for nail trim and/or IV catheter/injection placement in cephalic vein on left or right front leg. Zipper 50 may be unzipped to allow the physician to access the posterior portion of the cat, to permit substantially the same procedures as discuss above, including palpating the abdomen and bladder, obtaining sterile urine samples with a needle, for ultrasound viewing, for cleaning wounds, and/or to access the back legs for blood draws at the medial saphenous vein and to get blood pressure. Doors 62 and 64 may also be opened as shown at 90, to provide access for hind paw nail trims, and medial saphenous blood draws, etc.

The present invention has been described in particular detail with respect to various possible embodiments, and those of skill in the art will appreciate that the invention may be practiced in other embodiments. Also, the particular division of functionality between the various components described herein is merely exemplary, and not mandatory; functions performed by a single component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A method of handling and treating an animal, the method comprising:
    (a) providing a treatment and handling device including:
        a bag fabricated from a fabric material, the bag being sized and shaped to receive the animal's torso and legs therein, the bag having dorsal and ventral surfaces, each extending in a longitudinal direction from an anterior end to a posterior end;
        the bag having an adjustable collar disposed at the anterior end;
        the collar being adjustable with a first hook and loop fastener between an open position in which the collar forms an open loop to enable the animal's neck to be moved transversely into the collar, and a closed position in which the collar forms a closed loop around the animal's neck;
        a first zipper extending along the dorsal surface from an anterior end portion to a posterior end portion, the first zipper configured for closing the bag around the animal;
        an integral, elongated outer wrap having a length extending transversely to the longitudinal direction, and a width, wherein a central portion of the wrap is secured to the ventral surface of the bag so that opposite wrap end portions are extendable transversely on opposite sides of the bag, while being wrappable around the bag with the opposite wrap end portions being disposed in overlapping engagement and secured to one another to apply thoracic pressure to the animal;
        a plurality of doors being alternately openable and closable to provide physician access to the animal through the bag and through the outer wrap;
    (b) laying the bag on a surface with the opposite wrap end portions extending transversely on opposite sides of the bag;
    (c) opening the bag by unzipping the first zipper and placing the collar in the open position;
    (d) placing the animal in an upright/ventral recumbency position on top of the open bag;
    (e) placing the collar in the closed position around the neck of the animal;
    (f) zipping the first zipper to enclose and retain the animal in the bag;
    (g) lifting the opposite wrap end portions from opposite sides of the bag to wrap the outer wrap around the bag and the animal therein to apply thoracic pressure to the animal;
    wherein said (e), (f), and (g) are effected while maintaining the animal in the upright/ventral recumbency position without lifting the bag off the surface; and
    (h) selectively opening the plurality of doors and/or unzipping the first and second zippers, to provide physician access to the animal through the bag and/or the outer wrap.

2. The method of claim 1, wherein said lifting (g) comprises lifting the opposite wrap end portions from opposite sides of the bag to wrap the outer wrap around the bag and the animal therein with the opposite wrap end portions being disposed in overlapping engagement and secured to one another with second hook and loop fastener portions to apply thoracic pressure to the animal.

3. The method of claim 2, wherein said providing (a) further comprises the bag having a second zipper extending along a posterior end portion of the ventral layer, that provides physician access to the posterior of the animal.

4. The method of claim 3, wherein said providing (a) further comprises the plurality of doors being alternately openable and closable with third hook and loop fasteners.

5. The method of claim 4, wherein said providing (a) further comprises the plurality of doors including first and second doors extending through a posterior end portion of the dorsal surface on opposite sides of the first zipper.

6. The method of claim 5, wherein said providing (a) further comprises the plurality of doors including a third door extending through the central portion of the wrap and through the ventral layer.

7. The method of claim 6, wherein said providing (a) further comprises the plurality of doors including fourth and fifth doors extending through a posterior end portion of the ventral surface on opposite sides of the second zipper.

* * * * *